(12) United States Patent
Takeda

(10) Patent No.: US 7,623,164 B2
(45) Date of Patent: Nov. 24, 2009

(54) IMAGE SENSING APPARATUS AND METHOD FOR ACCURATE DARK CURRENT RECOVERY OF AN IMAGE SIGNAL

(75) Inventor: Nobuhiro Takeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 10/697,634

(22) Filed: Oct. 29, 2003

(65) Prior Publication Data

US 2004/0090547 A1 May 13, 2004

(30) Foreign Application Priority Data

Oct. 31, 2002 (JP) .............................. 2002-318405

(51) Int. Cl.
 *H04N 5/16* (2006.01)
(52) U.S. Cl. ....................................... 348/257; 348/243
(58) Field of Classification Search ................. 348/257, 348/243, 245, 241, 294, 246, 248, 249, 250
See application file for complete search history.

(56) References Cited

U.S. PATENT DOCUMENTS

| | | | |
|---|---|---|---|
| 5,355,164 A * | 10/1994 | Shimoyama et al. | 348/243 |
| 6,304,292 B1 * | 10/2001 | Ide et al. | 348/243 |
| 6,353,223 B1 * | 3/2002 | Ookawa | 250/330 |
| 6,700,609 B1 * | 3/2004 | Abe | 348/243 |

FOREIGN PATENT DOCUMENTS

JP 04-037166 2/1992

(Continued)

OTHER PUBLICATIONS

English Translation of JP 04-037166 A (Feb. 7, 1992) English Translation made on May 2007.*

(Continued)

*Primary Examiner*—Lin Ye
*Assistant Examiner*—Nelson D. Hernández Hernández
(74) *Attorney, Agent, or Firm*—Cowan, Liebowitz & Latman, P.C.

(57) ABSTRACT

An object of this invention is to enable performing accurate DC recovery operation for an output signal from an image sensing element, and obtaining a high-quality image free from any image degradation such as a horizontal streak. To achieve this object, an image sensing apparatus includes first and second clamping circuits on the output side of an image sensing element. The image sensing element outputs a signal from an effective pixel region, a first reference signal for DC recovery of an image signal that is set for each row, and a second reference signal that is uniformly set for the pixel region. The first clamping circuit DC-recovers a signal from the effective pixel region for each row on the basis of the first reference signal. The second clamping circuit uniformly DC-recovers signals from the effective pixel region for the pixel region on the basis of the second reference signal. The first reference signal is a signal obtained in a horizontal reference region free from any influence of an output from the photodiode of the image sensing element. The second reference signal is a signal which is obtained in a vertical optical black region and contains a dark current component generated in the photodiode of the image sensing element.

8 Claims, 8 Drawing Sheets

FOREIGN PATENT DOCUMENTS

| | | |
|---|---|---|
| JP | 08-307775 | 11/1996 |
| JP | 09-238287 | 9/1997 |
| JP | 2000-031450 | 1/2000 |
| JP | 2000-138869 | 5/2000 |
| JP | 2000-156822 | 6/2000 |
| JP | 2001-061108 | 6/2001 |
| JP | 2002-064196 | 2/2002 |
| JP | 2002-290841 | 10/2002 |

OTHER PUBLICATIONS

Japanese Office Action dated Jun. 6, 2006 (Japanese Patent Appln. No. 2002-318405).

* cited by examiner

IMAGE SENSING APPARATUS AND METHOD FOR ACCURATE DARK CURRENT RECOVERY OF AN IMAGE SIGNAL

FIELD OF THE INVENTION

The present invention relates to an image sensing apparatus and, more particularly, to DC recovery operation of an image sensing apparatus in which an image signal output from an image sensing element contains a signal from an effective pixel region and a signal from a DC recovery reference region.

BACKGROUND OF THE INVENTION

Image sensing elements used in an electronic still camera and the like are mainly interline CCDs (Charge-Coupled Devices). A conventional image sensing apparatus using the interline CCD is illustrated in FIGS. 7 and 8.

The conventional image sensing apparatus shown in FIGS. 7 and 8 includes an image sensing element 100 which is formed by an interline CCD, and an analog signal processing circuit 102 which is connected (AC-coupled) to the signal output side of the image sensing element 100 via a capacitor 101.

As shown in FIG. 7, the image sensing element 100 is comprised of a plurality of photodiodes 1 serving as photoelectric conversion elements which form a plurality of pixels two-dimensionally arrayed in the vertical direction (column direction) and horizontal direction (row direction) on the CCD image sensing plane for receiving incident light that forms an optical image of an object to be sensed, and photoelectrically convert light incident on pixels into signal charges corresponding to the intensity of light, read gates 2 which read out signal charges stored in the photodiodes 1, vertical transfer portions 3 which vertically transfer signal charges read out via the read gates 2, a horizontal transfer portion 4 which horizontally transfers signal charges vertically transferred from the vertical transfer portions 3, and a charge detection portion (output portion) 5 which converts signal charges transferred to the horizontal transfer terminal (output terminal) of the horizontal transfer portion 4 into a signal voltage and outputs the signal voltage.

The charge detection portion 5 is formed by, e.g., a known floating diffusion amplifier (FDA) connected to the transfer terminal of the horizontal transfer portion 4. The floating diffusion amplifier comprises a capacitor 51 which forms a floating capacitor for storing signal charges transferred to the transfer terminal of the horizontal transfer portion 4, a reset MOS transistor 52 having a reset pulse $\phi R$ application gate electrode for resetting a potential determined by signal charges stored in the capacitor 51 to a predetermined reference potential for each pixel, a reference power supply 53 for a reference potential that is connected to the drain of the MOS transistor 52, and an output amplifier (buffer) 54 which is formed by a plurality of source follower circuits using, e.g., MOS transistors, converts signal charges stored in the capacitor 51 into a signal voltage corresponding to a change in potential with respect to the reference potential, and outputs the signal voltage.

In the image sensing element 100 shown in FIG. 7, a region except the photodiodes 1 is covered with a light-shielding film such as an aluminum film, and shielded from light. Also in a region including the photodiodes 1, a horizontal optical black region 6 for obtaining a reference signal for determining the optical black (OB) level of an image signal is formed in the end region of rows in an effective pixel region 1a for obtaining an object image. In the horizontal OB region 6, the entire element surface including the photodiodes 1 is shielded from light. A signal detected by the charge detection portion 5 contains a signal photoelectrically converted by the photodiode 1 in the effective pixel region 1a, and a dark current component generated in the photodiode 1 and vertical transfer portion 3 in the horizontal OB region 6.

In the image sensing element 100, signal charges stored in the photodiodes 1 are read out, in accordance with a signal read pulse superposed on a vertical transfer pulse $\phi V1$, via the read gates 2 below the gate electrodes of the vertical transfer portions 3 to which the vertical transfer pulse $\phi V1$ is applied. Signal charges read out to the vertical transfer portions 3 are transferred row by row to the horizontal transfer portion 4 every horizontal scanning in accordance with vertical transfer pulses $\phi V1$ to $\phi V4$ of four phases. Signal charges of respective rows which are transferred to the horizontal transfer portion 4 are sequentially transferred to the charge detection portion 5 in accordance with horizontal transfer pulses $\phi H1$ and $\phi H2$ of two phases. Signal charges are converted into a signal voltage by the charge detection portion 5, and the signal voltage is applied as a CCD output signal to the analog signal processing circuit 102 via the capacitor 101 shown in FIG. 8.

The analog signal processing circuit 102 comprises a clamping circuit 103 which performs DC recovery operation, i.e., OB clamping of recovering the DC component of a signal AC-coupled via the capacitor 101 on the basis of an output signal (OB signal) from the horizontal optical black region 6 of the image sensing element 100, and a various-processing unit 104 which performs various signal processes such as gamma correction for an image signal generated by OB clamping. The clamping circuit 103 includes a reference power supply 106 for a reference voltage that is connected to the capacitor 101 via a switch 105.

While the image sensing element 100 outputs an OB signal from the horizontal optical black region 6, the switch 105 is turned on by a clamping pulse $\phi OB$ to connect the reference power supply 106 to the capacitor 101, thereby setting the signal processing circuit side of the capacitor 101 to the same voltage as the reference voltage. While the image sensing element 100 outputs a photographing signal via the photodiode 1 in the effective pixel region 1a, the switch 105 is turned off by the clamping pulse $\phi OB$ to generate an image signal for setting the OB signal to a DC-level reference (optical black level). OB clamping is executed for each row. After that, the various-processing unit 104 performs various processes to obtain a final image signal.

In the conventional image sensing apparatus described above, when the horizontal optical black region 6 of the image sensing element 100 suffers a light shielding error and light shielding is insufficient, or when a defect such as scratch exists in the photodiode 1 present in the horizontal optical black region 6 and a large dark current is generated, a redundant noise component is added to a signal from the horizontal optical black region 6, failing to obtain a reference signal of an accurate optical black level. The clamping circuit 103 executes erroneous DC recovery operation, resulting in image degradation such as a horizontal streak.

SUMMARY OF THE INVENTION

The present invention has been made in consideration of the conventional situation, and has as its object to provide an image sensing apparatus capable of recovering an accurate DC level for an output signal from an image sensing element, and obtaining a high-quality image free from any image degradation such as a horizontal streak.

To achieve the above object, according to the first aspect of the present invention, an image sensing apparatus using an image sensing element is comprising a setting device which sets, in one image signal output from the image sensing element, a signal from a predetermined pixel region, a first reference signal for DC recovery, and a second reference signal, a first DC recovery device which DC-recovers the signal from the predetermined pixel region for each row on the basis of the first reference signal set by the setting device, and a second DC recovery device which uniformly DC-recovers signals from the predetermined pixel region on the basis of the second reference signal set by the setting device.

According to the second aspect of the present invention, an image sensing apparatus is comprising a photoelectric conversion region which includes two-dimensionally arrayed photoelectric conversion elements, a first correction device which corrects a signal from the photoelectric conversion region on the basis of a first reference signal common to each line, and a second correction device which corrects the signal from the photoelectric conversion region on the basis of a second reference signal common to signals from the two-dimensionally arrayed photoelectric conversion elements, wherein the first reference signal includes a signal free from influence of a signal generated by the photoelectric conversion element, and the second reference signal contains a dark current component generated in the photoelectric conversion element.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An image sensing apparatus according to preferred embodiments of the present invention will be described below with reference to the accompanying drawings.

First Embodiment

Figure 1:
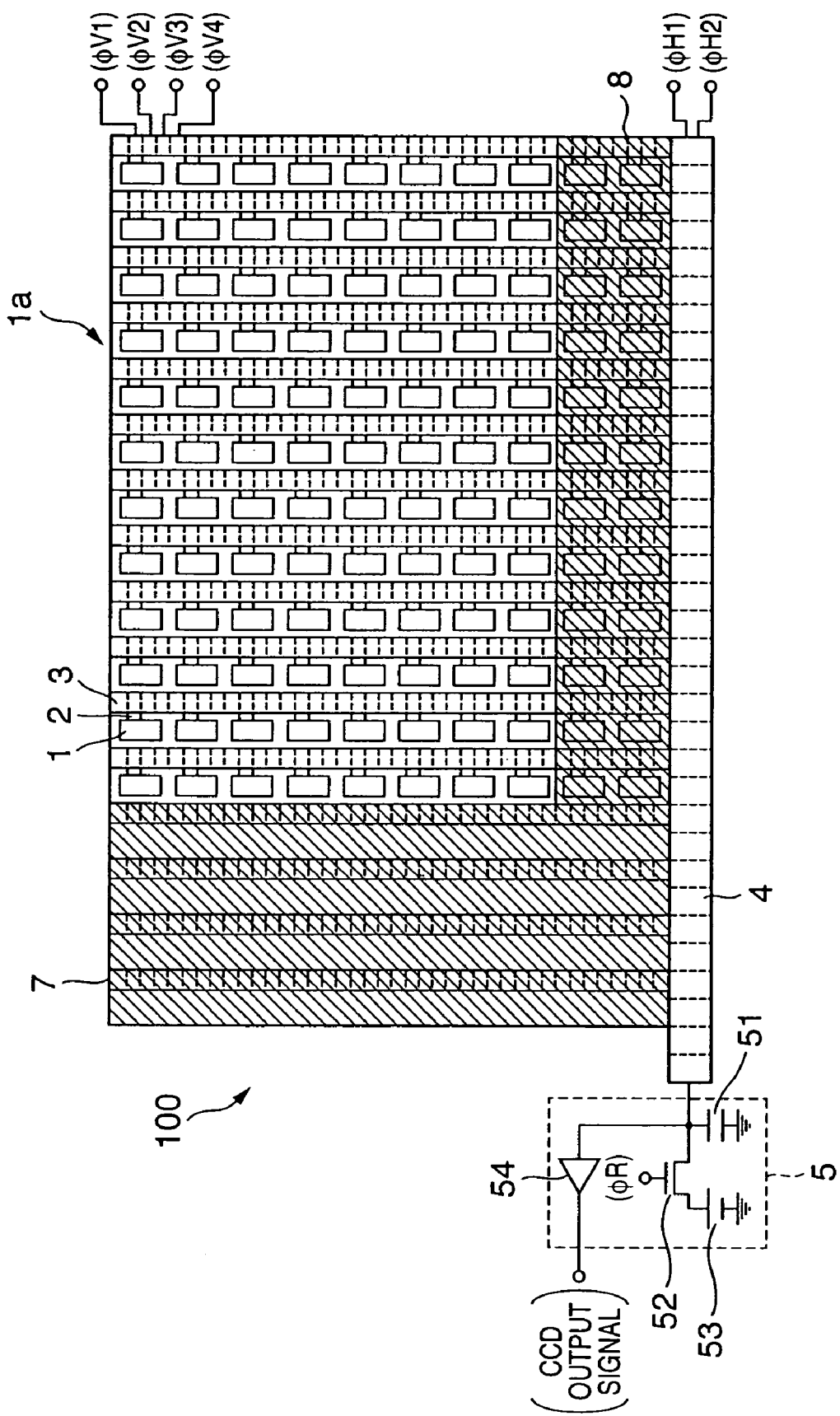
FIG. 1 is a view showing the arrangement of an image sensing element in an image sensing apparatus according to the first embodiment of the present invention.
Figure 2:
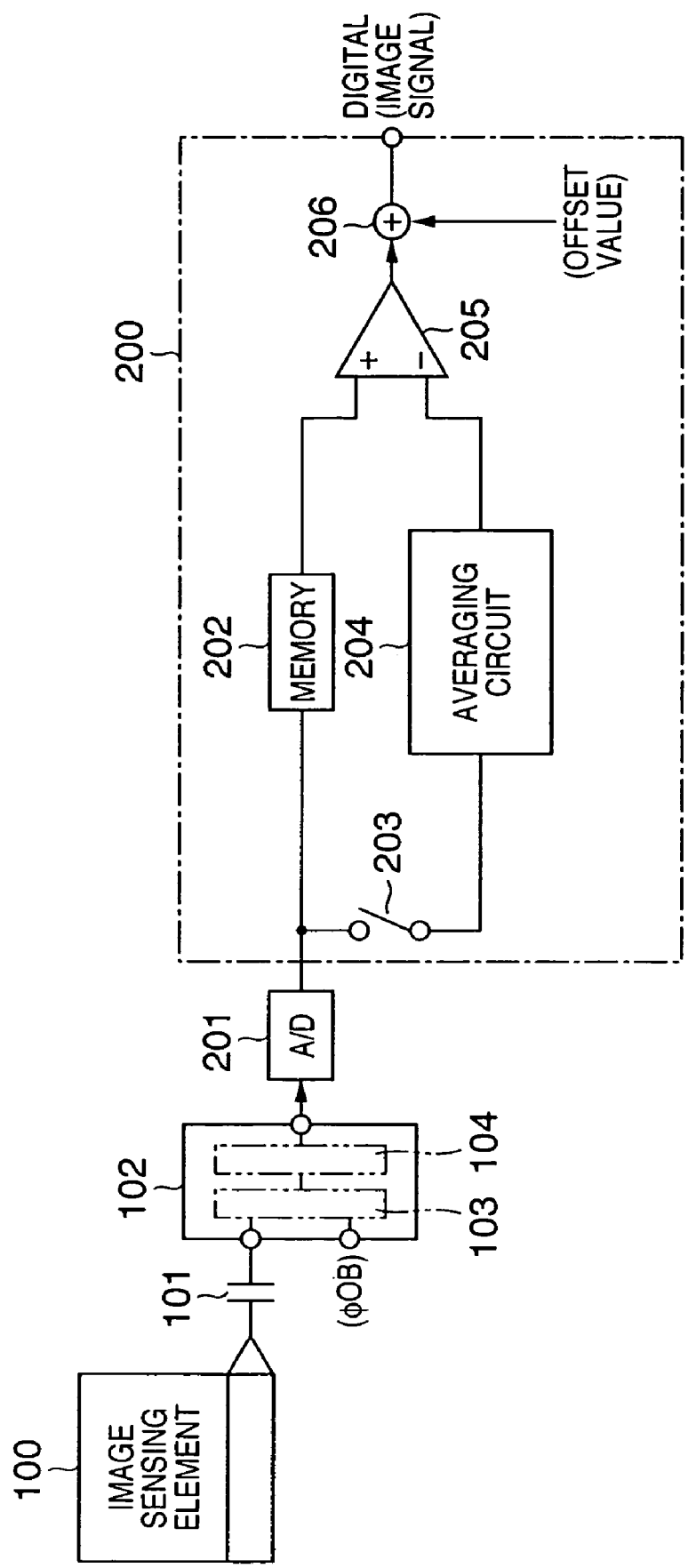
FIG. 2 is a diagram showing the arrangement of a signal processing circuit in the image sensing apparatus according to the first embodiment of the present invention.

FIGS. 1 and 2 are views for explaining an image sensing apparatus according to the first embodiment of the present invention. The image sensing apparatus according to the first embodiment includes an image sensing element 100 which is formed by an interline CCD, as shown in FIG. 1, an analog signal processing circuit 102 which is AC-coupled to the CCD output side of the image sensing element 100 via a capacitor 101, as shown in FIG. 2, and performs signal processing including clamping on the first stage (to be referred to as "first clamping" hereinafter) out of two-stage clamping of recovering a DC component from a CCD output signal output from the image sensing element 100, and a digital signal processing circuit which is connected to the analog signal processing circuit 102 via an A/D converter 201 and performs signal processing including clamping on the second stage (to be referred to as "second clamping" hereinafter) for the digital signal of an image signal having undergone various analog signal processes after the first clamping.

As shown in FIG. 1, the image sensing element 100 is comprised of photodiodes 1 serving as photoelectric conversion elements which form a plurality of pixels two-dimensionally arrayed at a predetermined pitch in the vertical direction (column direction) and horizontal direction (row direction) on the image sensing plane for receiving incident light that forms an optical image of an object to be sensed, and convert incident light into signal charges for each pixel, read gates 2 which read out signal charges stored in the photodiodes 1, vertical transfer portions 3 which vertically transfer signal charges read out via the read gates 2, a horizontal transfer portion 4 which horizontally transfers vertically transferred signal charges, and a charge detection portion 5 which is connected to the transfer terminal of the horizontal transfer portion 4.

The charge detection portion 5 is formed by, e.g., a known floating diffusion amplifier connected to the transfer terminal of the horizontal transfer portion 4. The floating diffusion amplifier comprises a capacitor 51 which forms a floating capacitor for storing signal charges transferred to the transfer terminal of the horizontal transfer portion 4, a reset MOS transistor 52 having a reset pulse $\phi R$ application gate electrode for resetting a potential determined by signal charges stored in the capacitor 51 to a predetermined reference potential for each pixel, a reference power supply 53 for a reference potential that is connected to the drain of the MOS transistor 52, and an output amplifier (buffer) 54 which is formed by a plurality of source follower circuits using, e.g., MOS transistors, converts signal charges stored in the capacitor 51 into a signal voltage corresponding to a change in potential with respect to the reference potential, and outputs the signal voltage.

At the charge detection portion 5, a pulse $\phi R$ is applied to the reset gate of the MOS transistor 52 at a predetermined timing to reset the floating diffusion amplifier every time a signal of one pixel is output. A signal voltage corresponding to signal charges is output for each pixel.

An effective pixel region (predetermined pixel region in the present invention) 1a for obtaining an object image is set on the image sensing element 100 shown in FIG. 1. As a reference region for obtaining the first reference signal of the present invention in an output signal, a horizontal reference signal region 7 in which only the vertical transfer portions 3 exist without any photodiode 1 is set in an end region of the effective pixel region 1a in the horizontal direction. Also, as a reference region for obtaining the second reference signal of the present invention in an output signal, a vertical optical black region 8 in which some photodiodes 1 are shielded from light and only a dark current component is output is set in an end region of the effective pixel region 1a that is adjacent to the horizontal transfer portion 4 in the vertical direction.

In the image sensing element 100, signal charges stored in the photodiodes 1 are read out, in accordance with a signal read pulse superposed on a vertical transfer pulse φV1, via the read gates 2 below the gate electrodes of the vertical transfer portions 3 to which the vertical transfer pulse φV1 is applied. Signal charges read out to the vertical transfer portions 3 are transferred row by row to the horizontal transfer portion 4 every horizontal scanning in accordance with vertical transfer pulses φV1 to φV4 of four phases. Signal charges of respective rows which are transferred to the horizontal transfer portion 4 are sequentially transferred to the charge detection portion 5 in accordance with horizontal transfer pulses φH1 and φH2 of two phases. Signal charges are converted into a signal voltage of each pixel by the charge detection portion 5. The CCD output signal, i.e., a signal including a signal from the effective pixel region 1a, a signal (horizontal reference signal serving as the first reference signal of the present invention) from the horizontal reference region 7, and a signal (OB signal serving as the second reference signal of the present invention) from the vertical optical black region 8 is output from the image sensing element 100 to the analog signal processing circuit 102 via the capacitor 101, as shown in FIG. 2.

As shown in FIG. 2, the analog signal processing circuit 102 comprises a clamping circuit (to be referred to as a "first clamping circuit" hereinafter) 103 serving as a first correction device having the same DC recovery function as the conventional one shown in FIG. 8, and a various-processing unit 104. The first clamping circuit 103 performs the first clamping as DC recovery operation to recover the DC component of a signal. The various-processing unit 104 then performs various analog signal processes such as gain correction to output the analog image signal to the digital signal processing circuit via the A/D converter 201.

As shown in FIG. 2, the digital signal processing circuit comprises, as a clamping circuit (to be referred to as a "second clamping circuit" hereinafter) 200 serving as a second correction device having a DC recovery function of performing the second clamping for an analog image signal input from the analog signal processing circuit 102 via the A/D converter 201, a memory 202 and switch 203 which are parallel-connected to the output side of the A/D converter 201, an averaging circuit 204 which is connected to the A/D converter 201 via the switch 203, a subtracter 205 which is connected to the output sides of the memory 202 and averaging circuit 204, and an adder 206 which is connected to the output side of the subtracter 205. The output side of the adder 206 is connected to a processor (not shown) which performs various digital signal processes.

Two-stage clamping operation (DC recovery operation) of recovering the DC component of a CCD output signal in the first embodiment will be explained.

Figure 8:
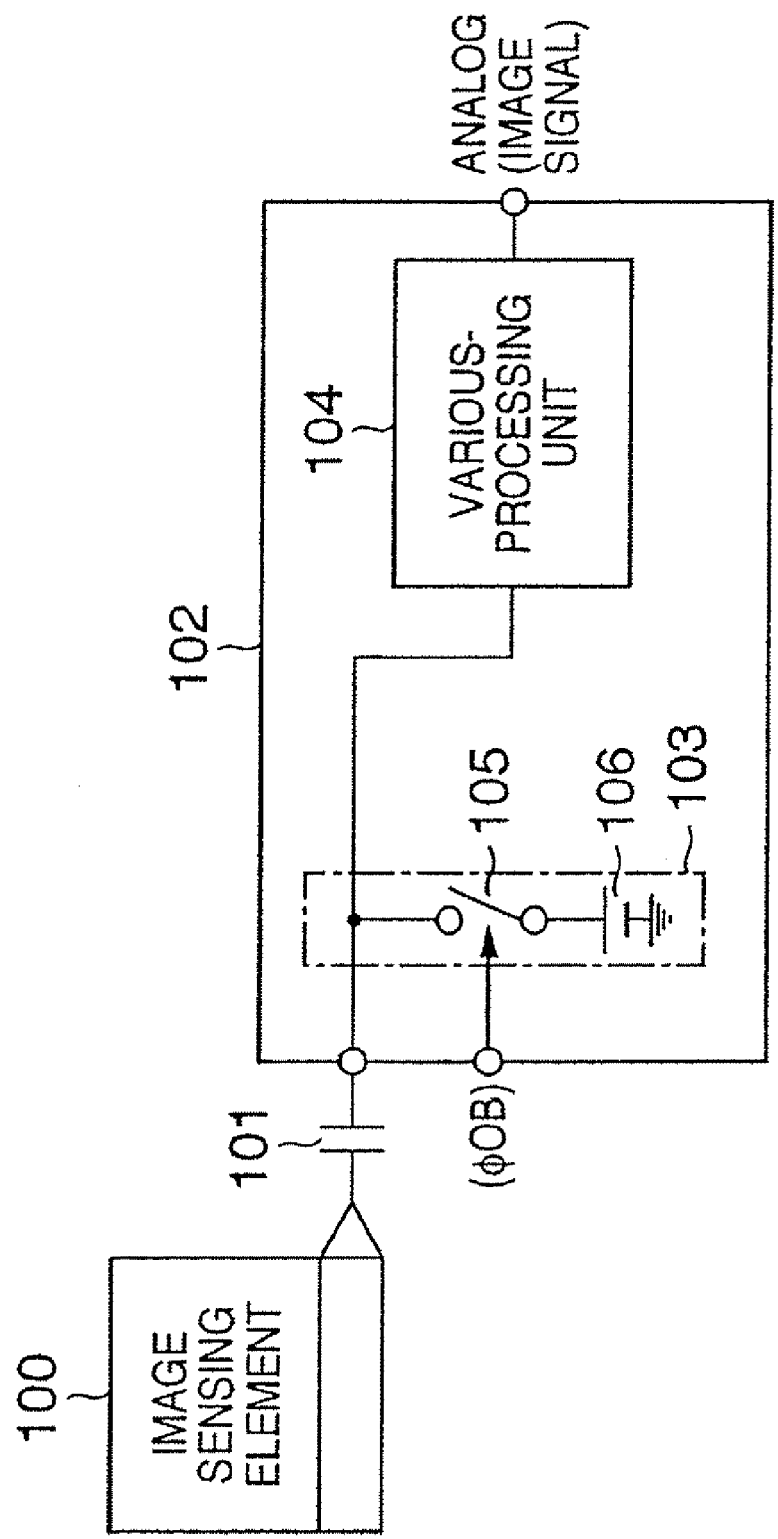
FIG. 8 is a diagram showing the arrangement of a signal processing circuit in the conventional image sensing apparatus.

The first clamping circuit 103 has the same arrangement and operation as those of the conventional clamping circuit 103 shown in FIG. 8. The first clamping circuit 103 is different from the conventional one in that not an OB signal from the horizontal optical black region 6 (see FIG. 8) but a horizontal reference signal from the horizontal reference region 7 is used as a clamping reference signal. In the first clamping circuit 103, while the image sensing element 100 outputs a horizontal reference signal obtained by the horizontal reference region 7, the switch 105 (see FIG. 8) is turned on by a clamping pulse φOB. Accordingly, the DC component of an image signal from the effective pixel region 1a is recovered for each row on the basis of the horizontal reference signal from the horizontal reference region 7.

The image signal having undergone the first clamping is subjected to various analog signal processes by the various-processing unit 104, and converted into a digital signal by the A/D converter 201. The digital signal is input to the second clamping circuit 200 of the digital signal processing circuit, and the image signal from the effective pixel region 1a is stored in the memory 202.

In the second clamping circuit 200, while a signal from the vertical optical black region 8 is output, the switch 203 is turned on to input an OB signal from the vertical optical black region 8 to the averaging circuit 204. The averaging circuit 204 calculates the average value of OB signals. The calculated average value is input to the subtracter 205, and subtracted from an image signal output from the memory 202. The image signal from which the average value of OB signals is subtracted is input to the adder 206 where a predetermined offset value is added to the image signal. The resultant image signal undergoes subsequent signal processing. As a result, the DC components of image signals from the effective pixel region 1a are uniformly recovered for the entire frame on the basis of the average value of OB signals from the vertical optical black region 8.

The first embodiment adopts a two-stage DC recovery circuit which recovers the DC component of a CCD output signal. When the optical black region of the image sensing element suffers a light shielding error and light shielding is insufficient, or when a defect such as scratch exists in the photodiode present in the optical black region and a large dark current is generated, a redundant noise component may be added to a signal from the optical black region. Even in this case, DC recovery of an image signal of each row by the first clamping operation is done on the basis of a signal from the horizontal reference region which does not include any photodiode. After that, uniform DC recovery of image signals of the entire frame by the second clamping operation is done on the basis of the average value of signals from the optical black region which includes photodiodes. Hence, any image degradation such as a horizontal streak can be reliably avoided without performing erroneous DC recovery operation by the clamping circuit.

Second Embodiment

Figure 3:
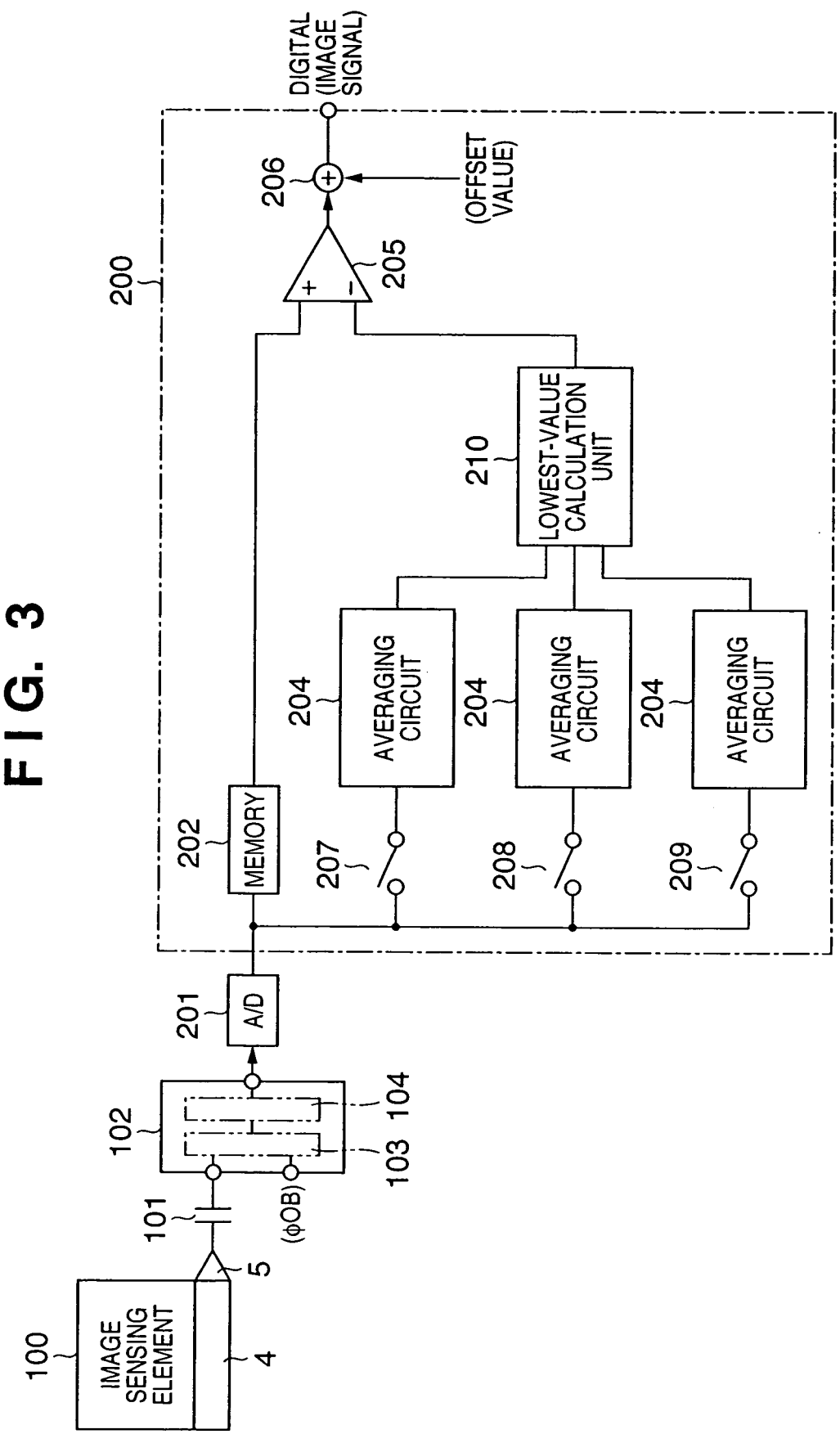
FIG. 3 is a diagram showing the arrangement of a signal processing circuit in an image sensing apparatus according to the second embodiment of the present invention.

FIG. 3 shows the arrangement of a DC recovery circuit in an image sensing apparatus according to the second embodiment of the present invention. In the second embodiment, an image sensing element 100 and first clamping circuit 103 are identical to those in the first embodiment, a description thereof will be omitted, and only the difference will be explained. In the second embodiment, the lowest value among average values obtained by dividing a vertical optical black region 8 into a plurality of regions and calculating the average value of signals from the vertical optical black region 8 for each divided region is used as the average value of signals from the vertical optical black region 8 that is to be subtracted from an image signal stored in a memory 202 in a second clamping circuit 200 serving as a second correction device for the second DC recovery.

As this circuit arrangement, the image sensing apparatus shown in FIG. 3 comprises a plurality of (three in this example) switches 207, 208, and 209, a plurality of (three in this example) averaging circuits 204 which are connected to these switches, and a lowest-value calculation unit 210 which is connected to the averaging circuits 204, instead of the switch 203 and averaging circuit 204 in the arrangement of the second clamping circuit 200 described above.

In this arrangement, an image signal having undergone the first clamping by the first clamping circuit 103 is converted into a digital signal by an A/D converter 201, input to the second clamping circuit 200, and stored in the memory 202. In the second clamping circuit 200 shown in FIG. 3, while signals from predetermined regions of the vertical optical black region 8 are output, the switches 207, 208, and 209 are turned on, and vertical optical black signals from these regions are input to the three independent averaging circuits 204.

The averaging circuits 204 calculate the average values of signals from corresponding regions of the vertical optical black region 8. The three calculated average values are input to the lowest-value calculation unit 210, and the lowest value among the three average output values is selected and output. The obtained lowest value is input to a subtracter 205, and subtracted from an image signal output from the memory 202. The image signal from which the lowest value among the average values of divided regions of the vertical optical black region 8 is subtracted is input to an adder 206 where a predetermined offset value is added. The resultant image signal undergoes subsequent signal processing.

According to the second embodiment, the vertical optical black region is divided into a plurality of regions to calculate average values, and the second clamping is executed using the lowest value. In addition to the same effects as those of the first embodiment, even if the vertical optical black signal is shaded by a dark current component, clamping as DC recovery operation can be achieved without any pepper noise.

In the second embodiment, calculation is done by dividing the vertical optical black region into three regions, but the number of regions is not limited to three. Divided regions may overlap each other.

In the first and second embodiments, the averaging circuit 204 calculates the average value of the vertical optical black region 8. However, the averaging circuit 204 is not limited to the average value, and may calculate a median or mode.

Other arrangement examples (to be referred to as the first to third modifications hereinafter) of the image sensing element described in the embodiments of the present invention will be explained with reference to FIGS. 4 to 6.

Figure 4:
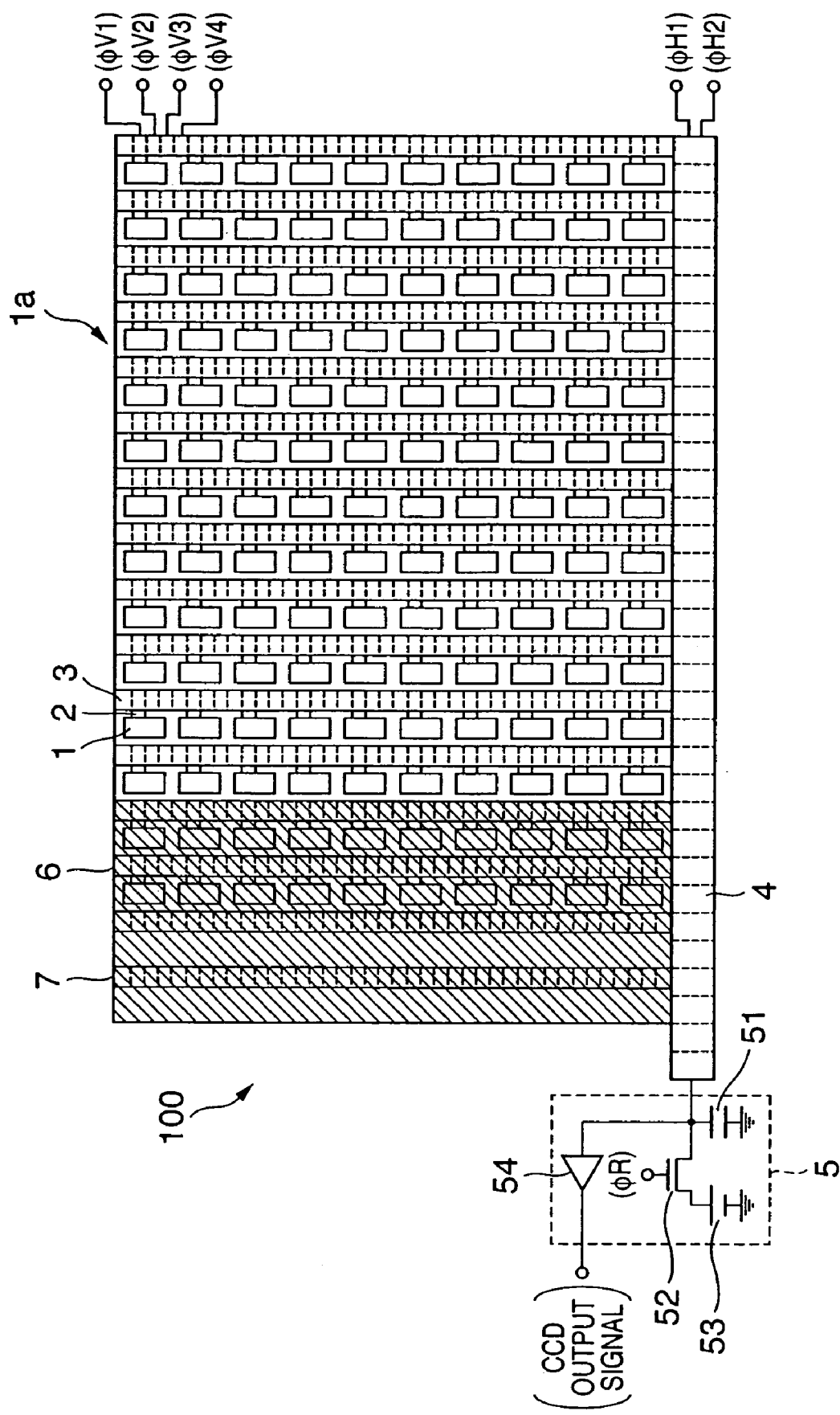
FIG. 4 is a view showing the arrangement of an image sensing element in an image sensing apparatus according to the first modification of the present invention.

FIG. 4 shows an image sensing apparatus according to the first modification. In FIG. 4, reference numeral 6 denotes a horizontal optical black region (region for obtaining the second reference signal of the present invention) identical to the conventional one on the image sensing element 100; and 7, a horizontal reference region (region for obtaining the first reference signal of the present invention) identical to that of the first embodiment on the image sensing element 100. The arrangement of the first modification is the same as those of the first and second embodiments in that the first clamping is performed for each row by the first clamping circuit using an output signal from the horizontal reference region 7. However, the arrangement of the first modification is different in that the second clamping by the second clamping circuit is uniformly performed for the entire frame by using a signal not from the vertical optical black region 8 (see FIG. 1) but from the horizontal optical black region 6. The first modification can also attain the same effects as those of the first and second embodiments.

Figure 5:
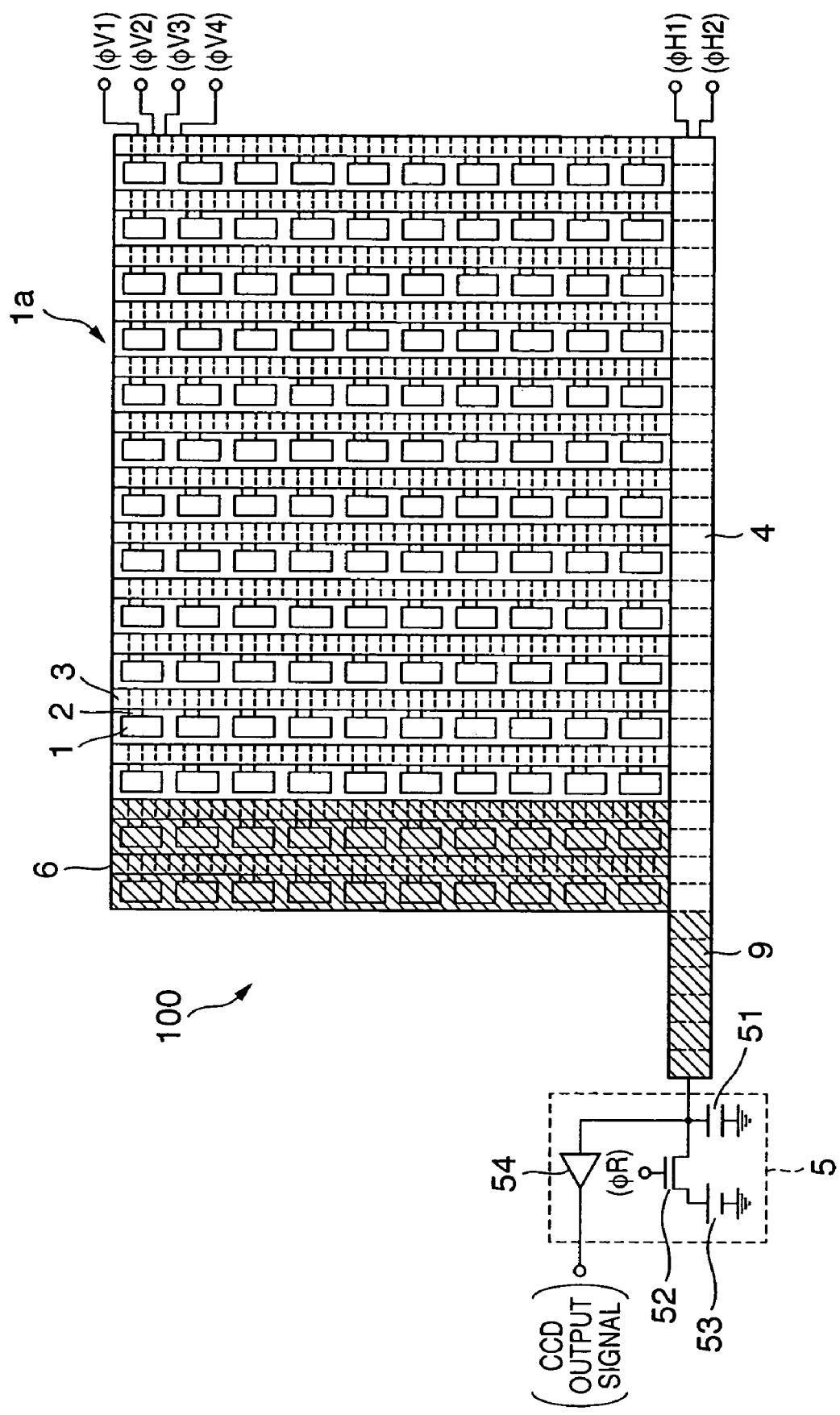
FIG. 5 is a view showing the arrangement of an image sensing element in an image sensing apparatus according to the second modification of the present invention.

FIG. 5 shows an image sensing apparatus according to the second modification. In FIG. 5, reference numeral 6 denotes a horizontal optical black region (region for obtaining the second reference signal of the present invention) identical to the conventional one on the image sensing element 100; and 9, a horizontal dummy region (region for obtaining the first reference signal of the present invention) on the image sensing element 100. The horizontal dummy region 9 is set at the horizontal transfer portion 4 to which no vertical transfer portion 3 is connected.

The arrangement of the second modification is different from those of the first and second embodiments and first modification in that the first clamping by the first clamping circuit is performed for each row by using an output signal from the horizontal dummy region 9. The arrangement of the second modification is the same as that of the first modification in that the second clamping by the second clamping circuit is uniformly performed for the entire frame by using a signal from the horizontal optical black region 6.

The second modification can also obtain the same effects as those of the first and second embodiments. As an additional effect, the image sensing element can be downsized because no horizontal reference region need be set on an image sensing element for obtaining the second reference signal for DC recovery.

Figure 6:
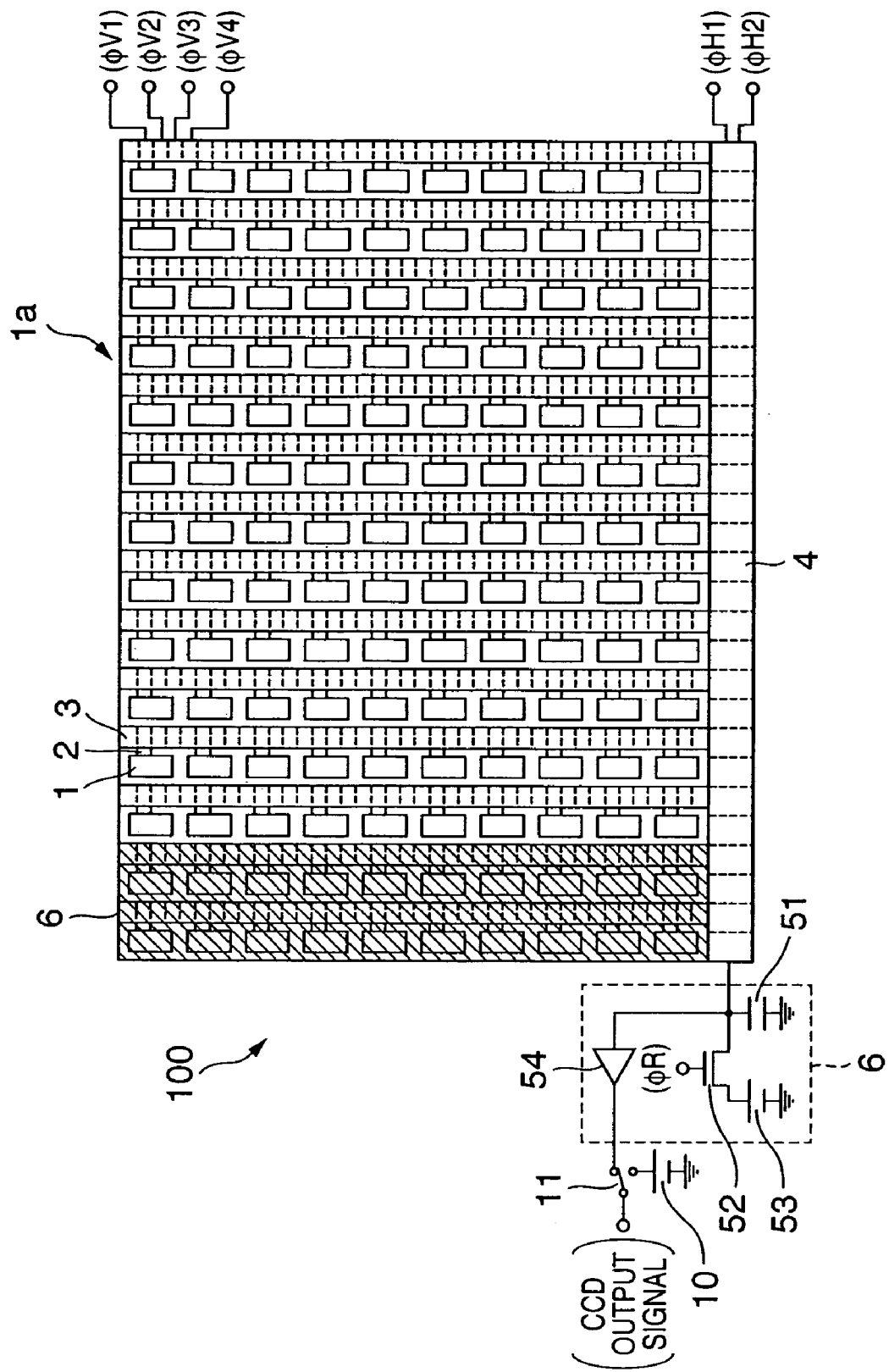
FIG. 6 is a view showing the arrangement of an image sensing element in an image sensing apparatus according to the third modification of the present invention.
Figure 7:
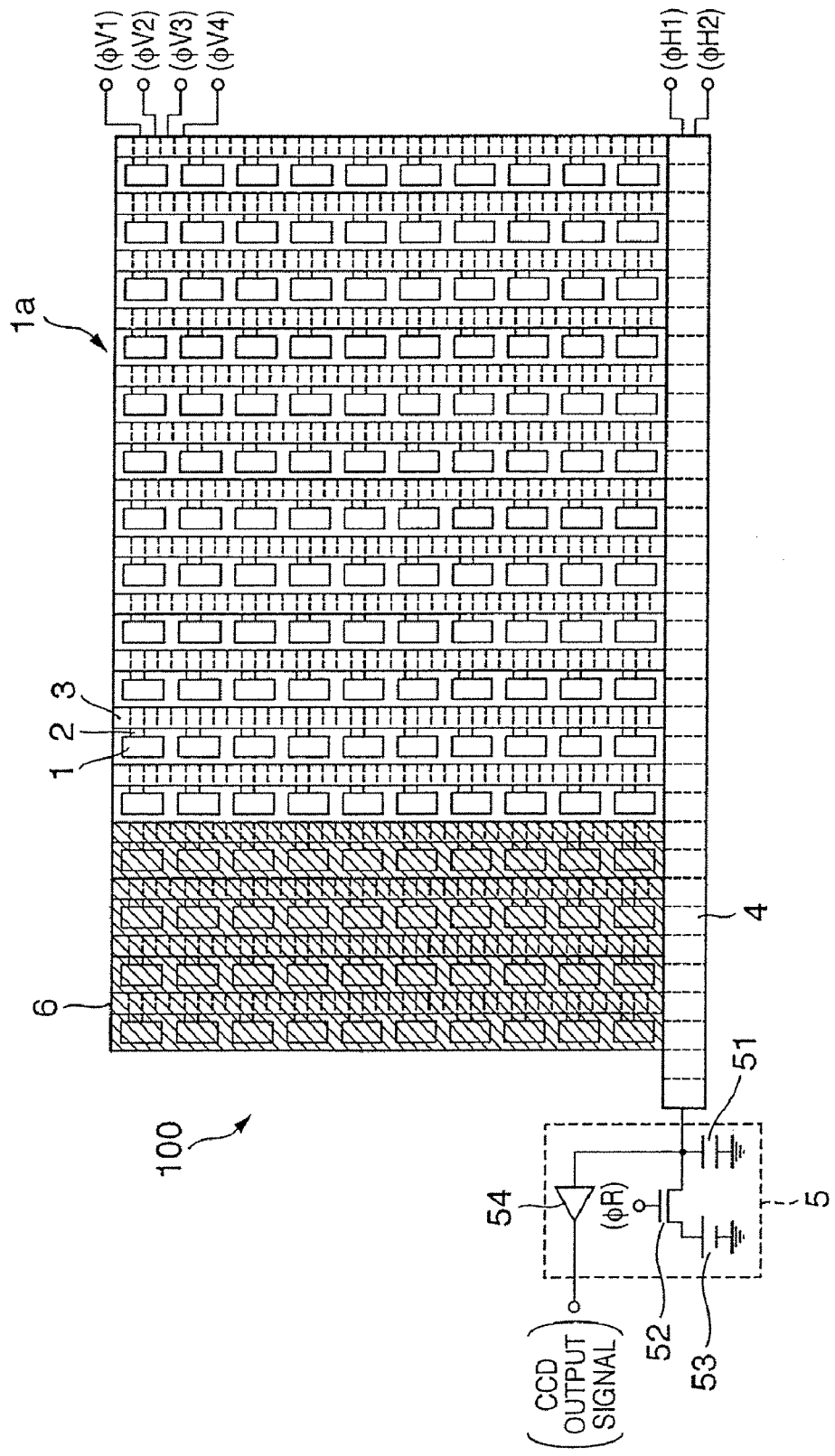
FIG. 7 is a view showing the arrangement of an image sensing element in a conventional image sensing apparatus.

FIG. 6 shows an image sensing apparatus according to the third modification. In FIG. 6, reference numeral 6 denotes a horizontal optical black region (region for obtaining the second reference signal of the present invention) identical to the conventional one on the image sensing element 100; 10, a reference voltage source for a reference voltage (first reference signal of the present invention); and 11, a switch. The switch 11 is so controlled as to be connected normally to the output side of the charge detection portion 5 and to the reference voltage source 10 for a predetermined period for each row. This allows outputting the reference voltage for each row to a signal output from the image sensing element 100.

The arrangement of the third modification is different from those of the first and second embodiments and first and second modifications in that the first clamping by the first clamping circuit is performed for each row by using a signal to which the reference voltage is output from the reference voltage source 10. The arrangement of the third modification is the same as those of the first and second modifications in that the second clamping is uniformly performed for the entire frame by the second clamping circuit using a signal from the horizontal optical black region 6.

The third modification can also obtain the same effects as those of the first and second embodiments. As an additional effect, the image sensing element can be downsized because no horizontal reference region or horizontal dummy region need be set on an image sensing element for obtaining the first reference signal for DC recovery.

The image sensing apparatuses according to the first and second embodiments and first to third modifications adopt an interline CCD as an image sensing element. However, the present invention is not always limited to this, and can be applied to a CCD transfer image sensing element such as a frame transfer CCD or an X-Y address image sensing element such as a CMOS sensor as far as the arrangement can obtain an image signal for outputting for each row the first reference signal which does not influence the performance of the photodiode and outputting the second reference signal which outputs a dark current component generated in the photodiode.

In the image sensing apparatuses according to the first and second embodiments and first to third modifications, the first clamping as DC recovery operation of an image signal is done using an analog signal, and the second clamping is done using a digital signal. The present invention is not limited to this, and the two clamping operations may be executed using either an analog or digital signal.

As has been described above, according to the above embodiments, accurate DC recovery operation can be performed for an output signal from the image sensing element, obtaining a high-quality image free from any image degradation such as a horizontal streak.

The present invention is not limited to the above embodiments and various changes and modifications can be made within the spirit and scope of the present invention. Therefore, to apprise the public of the scope of the present invention the following claims are made.

What is claimed is:

1. An image sensing apparatus using an image sensing element which has a plurality of pixels arrayed in horizontal and vertical directions, wherein:

the image sensing element includes an effective pixel area which outputs signal of an object image, a first reference pixel area which outputs a first reference signal, and a second reference pixel area which outputs a second reference signal, wherein a pixel in the first reference pixel area is shielded from light and does not have a photoelectric conversion element, and wherein a pixel in the second reference pixel area is shielded from light and has a photo-electric conversion element and outputs a signal including dark current component generated in the photoelectric conversion element, said image sensing apparatus comprising:

a first correction unit that corrects signals of the effective pixel area by subtracting the first reference signal from each horizontal line signal of the effective pixel area with respect to each corresponding horizontal line; and a second correction unit that uniformly corrects signals of the entire effective pixel area, which are corrected by said first correction unit, by evenly subtracting a representative value, which is based on the second reference signal, from the signals of the plurality of horizontal lines of the effective pixel area.

2. The apparatus according to claim 1, wherein the first reference signal includes a signal free from influence of a signal converted by a photoelectric conversion element of the image sensing element, and the second reference signal includes a signal containing a dark current component generated in the photoelectric conversion element of the image sensing element.

3. The apparatus according to claim 2, wherein the second reference signal includes a signal obtained in a region which includes the photoelectric conversion element in the image sensing element and is shielded from incident light.

4. The apparatus according to claim 3, wherein the first reference signal includes a signal obtained in a region which does not include the photoelectric conversion element in the image sensing element.

5. The apparatus according to claim 3, wherein the first reference signal includes a signal output from a reference power supply for each row of the predetermined pixel region.

6. The apparatus according to claim 1, wherein said second correction unit has a storage device which stores the signal from the effective pixel area, a calculation device which calculates a representative value of the second reference signal, and a subtraction device which subtracts the representative value of the second reference signal that is calculated by the calculation device, from the signal from the effective pixel area that is stored in the storage device.

7. The apparatus according to claim 6, wherein the calculation device has a calculation which calculates representative values of the second reference signal for a plurality of regions obtained by dividing the region which includes the photoelectric conversion element in the image sensing element and is shielded from incident light, and a device which outputs to the subtraction device a lowest value among the representative values of the plurality of regions that are calculated by the calculation device.

8. The apparatus according to claim 6, wherein the representative value includes any one of an average value, a median, and a mode.

* * * * *